(12) United States Patent
Long et al.

(10) Patent No.: US 9,885,565 B2
(45) Date of Patent: Feb. 6, 2018

(54) BACKLIGHT SOURCE FLATNESS DETECTION SYSTEM AND BACKLIGHT SOURCE FLATNESS DETECTION METHOD

(71) Applicants: BOE TECHNOLOGY GROUP CO., LTD., Beijing (CN); BOE OPTICAL SCIENCE AND TECHNOLOGY CO., LTD., Suzhou (CN)

(72) Inventors: Dengwu Long, Beijing (CN); Jiang Yu, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

(*) Notice: Subject to any disclaimer, the term of this patent is extended or adjusted under 35 U.S.C. 154(b) by 8 days.

(21) Appl. No.: 15/235,855

(22) Filed: Aug. 12, 2016

(65) Prior Publication Data
US 2017/0234680 A1    Aug. 17, 2017

(30) Foreign Application Priority Data
Feb. 17, 2016 (CN) .......................... 2016 1 0089462

(51) Int. Cl.
*G01J 5/00* (2006.01)
*G01B 11/30* (2006.01)

(52) U.S. Cl.
CPC .................................. *G01B 11/306* (2013.01)

(58) Field of Classification Search
CPC .. G01B 11/303; G01B 11/306; G01B 9/02025
(Continued)

(56) References Cited

U.S. PATENT DOCUMENTS 3,255,528 A * 6/1966 Brynk .................... G01B 5/004
                                                                33/1 M
9,716,843 B2 * 7/2017 Fox .......................... H04N 5/33
(Continued)

FOREIGN PATENT DOCUMENTS

CN         101424519 A      5/2009
CN         103363928 A      10/2013
(Continued)

OTHER PUBLICATIONS

Office Action regarding Chinese Patent Application No. 201610089462.4, dated Sep. 4, 2017. Translation provided by Dragon Intellectual Property Law Firm.

*Primary Examiner* — Taeho Jo
(74) *Attorney, Agent, or Firm* — Harness, Dickey & Pierce, P.L.C.

(57) ABSTRACT

The present disclosure provides a backlight source flatness detection system and a backlight source flatness detection method. The backlight source flatness detection system includes: a working table, a support column, a detection device, a processor and a display device. The working table is transparent and carries a to-be-detected backlight source. The support column supports the working table. The detection device is below the working table and detects distances between the detection device and at least two detection positions of the to-be-detected backlight source. The at least two detection positions includes at least one position of a center area and at least one position of a peripheral area. The processor is connected to the detection device and processes a detection result from the detection device so as to acquire a warpage value. The display device is connected to the processor and to display the warpage value acquired by the processor.

20 Claims, 6 Drawing Sheets

(58) Field of Classification Search
USPC .................................................. 250/338.1
See application file for complete search history.

(56) References Cited

U.S. PATENT DOCUMENTS

| | | | | |
|---|---|---|---|---|
| 2002/0083607 A1* | 7/2002 | Atsuhiko | ............... | G01B 5/285 33/553 |
| 2006/0119906 A1* | 6/2006 | Park | ............... | G01B 11/14 358/488 |
| 2007/0233312 A1* | 10/2007 | Nakashima | ............... | B23Q 15/14 700/173 |
| 2009/0055009 A1* | 2/2009 | Nakashima | ............... | G05B 19/4093 700/103 |
| 2010/0040277 A1* | 2/2010 | Kao | ............... | G01N 21/86 382/141 |
| 2010/0141936 A1* | 6/2010 | Aizawa | ............... | G01N 21/94 356/237.2 |
| 2011/0317146 A1* | 12/2011 | Gu | ............... | G01C 3/10 356/4.03 |
| 2012/0062867 A1* | 3/2012 | Shibatani | ............... | G01C 3/085 356/4.01 |
| 2013/0054193 A1* | 2/2013 | Schajer | ............... | G01B 21/20 702/167 |
| 2013/0321823 A1* | 12/2013 | Takahashi | ............... | G01B 11/24 356/601 |
| 2016/0054237 A1* | 2/2016 | Gerbelot | ............... | G01N 21/95684 356/237.5 |
| 2016/0334207 A1* | 11/2016 | Chern | ............... | G01B 11/167 |
| 2017/0015180 A1* | 1/2017 | Sakamoto | ............... | B60J 1/02 |
| 2017/0038892 A1* | 2/2017 | Ikeda | ............... | G03B 17/54 |
| 2017/0039030 A1* | 2/2017 | Ikeda | ............... | G03B 17/54 |
| 2017/0041581 A1* | 2/2017 | Ikeda | ............... | G03B 17/54 |
| 2017/0122730 A1* | 5/2017 | Prochoda | ............... | G01C 3/08 |

FOREIGN PATENT DOCUMENTS

| | | |
|---|---|---|
| CN | 103940378 A | 7/2014 |
| CN | 103983218 A | 8/2014 |
| JP | 2013167445 A | 8/2013 |

* cited by examiner

BACKLIGHT SOURCE FLATNESS DETECTION SYSTEM AND BACKLIGHT SOURCE FLATNESS DETECTION METHOD

CROSS-REFERENCE TO RELATED APPLICATION

The present application claims a priority of the Chinese patent application No. 201610089462.4 filed on Feb. 17, 2016, which is incorporated herein by reference in its entirety.

TECHNICAL FIELD

The present disclosure relates to the field of display technology, in particular to a backlight source flatness detection system and a backlight source flatness detection method.

BACKGROUND

Along with the rapid development of the display technology, display devices are more demanding than ever before. As an important part of the display device, a backlight source serves as a light source for a display panel. During the manufacture, the backlight source may easily be warped upwardly or downwardly, i.e., the backlight source may be uneven. The display quality of the display device may be adversely affected by the flatness of the backlight source.

Usually, a coordinate measurement machine, a height gauge or a thickness gauge may be used to detect the flatness of the backlight source.

However, the coordinate measurement machine and the height gauge are expensive and cannot be operated conveniently. In addition, they need to be operated by specially trained personnel. For the thickness gauge, sheet-like gauges are inserted into a plurality of gaps between the backlight source and a surface of a working table, and sizes of the gaps are read through the thickness gauge, so as to determine the flatness of the backlight source. The number of the sheet-like gauges needed to be inserted into the gaps may be determined by experience, so a detection result is not accurate, the detection is inefficient, and it is impossible to detect the flatness of the backlight sources on a large scale.

SUMMARY

An object of the present disclosure is to provide a backlight source flatness detection system and a backlight source flatness detection method, so as to reduce the detection cost, simplify the operation, and improve the detection accuracy and efficiency.

In one aspect, the present disclosure provides in some embodiments a backlight source flatness detection system, including: a working table which is transparent and whereon a to-be-detected backlight source is placed; a support column whereon the working table is; a detection device below the working table and configured to detect distances between the detection device and at least two detection positions of the to-be-detected backlight source, the at least two detection positions including at least one position of a center area of the to-be-detected backlight source and at least one position of a peripheral area of the to-be-detected backlight source; a processor connected to the detection device and configured to process a detection result from the detection device so as to acquire a warpage value; and a display device connected to the processor and configured to display the warpage value acquired by the processor.

Further, the detection device includes at least two infrared distance measurement sensors.

Further, the detection device includes at least five infrared distance measurement sensors, at least one of the infrared distance measurement sensors is at a position corresponding to the position of the center area of the to-be-detected backlight source, and at least four of the infrared distance measurement sensors are at positions corresponding to positions of the peripheral area of the to-be-detected backlight source.

Further, the system further includes a support plate and a controller, the support column and the infrared distance measurement sensors are at an upper surface of the support plate, and the controller is connected to all the infrared distance measurement sensors and configured to control the number of the infrared distance measurement sensors for detecting the to-be-detected backlight source.

Further, the processor includes a maximum distance calculation module, a minimum distance calculation module, and a subtractor configured to subtract a minimum distance acquired by the minimum distance calculation module from a maximum distance acquired by the maximum distance calculation module.

Further, the support column includes a support member with screw threads, and an adjustment member with screw threads; the screw threads of the support member engage with the screw threads of the adjustment member to adjust a height of the support member.

Further, the system further includes at least two retaining walls on the working table and on at least two adjacent edges of the working table.

Further, the system further includes an alarm device connected to the processor. The processor is further configured to compare the warpage value with a predetermined value, and in the case that the warpage value is greater than the predetermined value, send an alarm signal to the alarm device. The alarm device is configured to send an alarm in accordance with the received alarm signal.

In another aspect, the present disclosure provides in some embodiments a backlight source flatness detection method using the above-mentioned backlight source flatness detection system, including steps of: detecting, by a detection device, distances between the detection device and at least two detection positions of a to-be-detected backlight source, the at least two detection positions including at least one position of a center area of the to-be-detected backlight source and at least one position of a peripheral area of the to-be-detected backlight source; processing, by a processor, a detection result from the detection device to acquire a warpage value; and controlling a display device to display the warpage value acquired by the processor.

Further, the step of processing, by the processor, the detection result from the detection device to acquire the warpage value includes subtracting, by the processor, a minimum distance from a maximum distance detected by the detection device to acquire the warpage value.

Further, the step of processing, by the processor, the detection result from the detection device to acquire the warpage value includes acquiring, by the processor and through fitting, a plane in accordance with the detected distances between the to-be-detected backlight source and the detection device, and calculating, by the processor, distances between the detection device and the plane and taking a maximum distance as the warpage value.

Further, the step of processing, by the processor, the detection result from the detection device to acquire the warpage value includes: detecting, by the detection device, a standard backlight source that meets a flatness requirement and detecting distances between the detection device and the standard backlight source as reference distances; subtracting, by the processor, the reference distances from the detected distances between the detection device and the to-be-detected backlight source at corresponding positions, so as to acquire a maximum distance and a minimum distance; and subtracting, by the processor, the minimum distance from the maximum distance, so as to acquire the warpage value.

Further, the detection device includes at least two infrared distance measurement sensors, and the method further includes controlling the display device to display distances between the at least two detection positions of the to-be-detected backlight source and the infrared distance measurement sensors, and identifiers of the corresponding infrared distance measurement sensors.

Further, the step of processing, by the processor, the detection result from the detection device to acquire the warpage value, further includes comparing the warpage value with a predetermined value, and in the case that the warpage value is greater than a predetermined value, sending an alarm signal to an alarm device, so as to enable the alarm device to send an alarm.

Further, prior to detecting the to-be-detected backlight source, the method further includes detecting flatness of a working table. The step of detecting the flatness of the working table includes: detecting a warpage value of a standard backlight source which meets a flatness requirement and which is placed on the working table; in the case that the warpage value of the standard backlight source displayed by the display device is acceptable, detecting, by the detection device, the flatness of the to-be-detected backlight source; and in the case that the warpage value of the standard backlight source displayed by the display device is unacceptable, adjusting a height of a support column in support of the working table.

Further, the system further includes a support plate and a controller, the support column and the infrared distance measurement sensors are arranged at an upper surface of the support plate, and the controller is connected to all the infrared distance measurement sensors and configured to control the number of the infrared distance measurement sensors for detecting the to-be-detected backlight source.

Further, the support column includes a support member with screw threads, and an adjustment member with screw threads; the screw threads of the support member engage with the screw threads of the adjustment member to adjust a height of the support member.

Further, the system further includes at least two retaining walls on the working table and perpendicular to each other.

According to the backlight source flatness detection system and the backlight source flatness detection method in the embodiments of the present disclosure, the distances between the detection device and the at least two detection positions, i.e., at least one position of the center area of and at least one position of the peripheral area, of the to-be-detected backlight source on the working table may be detected by the detection device, then the distances may be processed by the processor to acquire the warpage value of the to-be-detected backlight source, and then the warpage value may be displayed by the display device. The system merely includes the working table, the support column, the detection device, the processor, the display device and some auxiliary members, so it is relatively cheap and has a simple structure. In addition, the flatness of the to-be-detected backlight source may be detected by the detection device after it is placed on the working table, so as to achieve the detection in a convenient and efficient manner, thereby to detect the flatness of the backlight sources on a large scale. Further, at least one position of the center area and at least one position of the peripheral area of the to-be-detected backlight source are detected by the detection device, so it is able to improve the detection accuracy.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
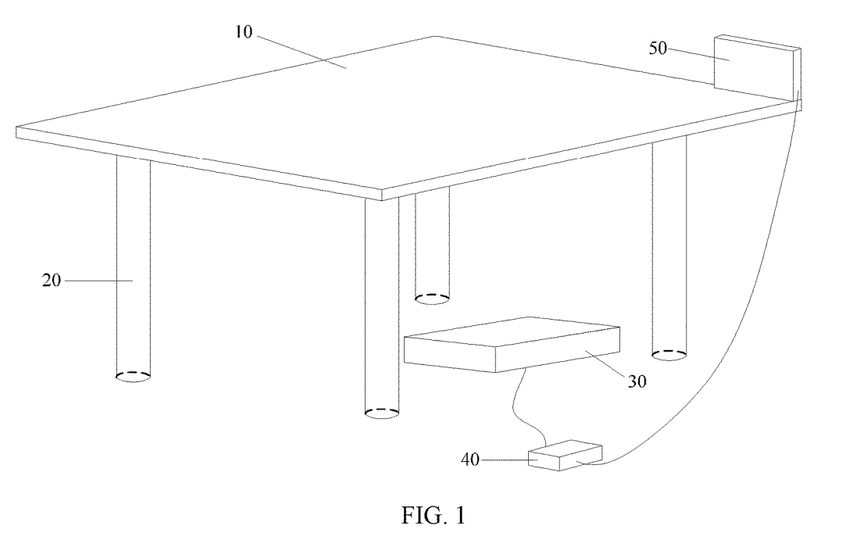
FIG. 1 is a schematic view showing a backlight source flatness detection system according to one embodiment of the present disclosure.

The present disclosure provides in some embodiments a backlight source flatness detection system which, as shown in FIG. 1, includes: a working table 10, support columns 20, a detection device 30, a processor 40 and a display device 50.

The working table 10 is transparent and carries a to-be-detected backlight source. The support columns 20 support the working table 10.

The detection device 30 is arranged below the working table. The detection device 30 is to detect distances between the detection device 30 and at least two detection positions of the to-be-detected backlight source. The at least two detection positions include at least one position of a center area of the to-be-detected backlight source and at least one position of a peripheral area of the to-be-detected backlight source.

The processor 40 is connected to the detection device 30. The processor 40 is to process a detection result from the detection device 30 so as to acquire a warpage value.

The display device 50 is connected to the processor 40. The display device 50 is to display the warpage value acquired by the processor 40.

The working table 10 may be made of any material, as long as the detection of the flatness of the to-be-detected backlight source may not be adversely affected. For example, the working table may be made of tempered glass. The system may be used for detecting the flatness of the backlight sources in various sizes, so the working table 10 may be of any size, as long as the to-be-detected backlight sources in various sizes may be placed thereon.

The support columns 20 may be provided in an amount sufficient to support the working table 10, e.g., three support columns 20 may be provided. In some embodiments, as shown in FIG. 1, the number of the support columns 20 is greater than or equal to 4, and at least one support column is arranged at each corner of the working table 10.

The detection device 30 may be of any kind, as long as it may detect the distance between the to-be-detected backlight source and the detection device 30. For example, the detection device 30 may be an infrared distance measurement sensor or an ultrasonic distance measurement sensor.

During the manufacture, the backlight source may be warped downwardly or upwardly. In the case that it is warped downwardly, a distance between the position of the center area of the to-be-detected backlight source and the detection device 30 is the minimum, and in the case that it is warped upwardly, the distance between the position of the center area and the detection device 30 is the maximum. Hence, at least one position of the center area of the to-be-detected backlight source may be detected. In addition, for comparison, at least one position of the peripheral area may also be detected.

In addition, the position of the center area of the to-be-detected backlight source may not necessarily a center thereof, and instead, it may be any position at the center area of the to-be-detected backlight source. Identically, the position of the peripheral area of the to-be-detected backlight source may be any position close to the peripheral area thereof.

The display device 50 may be arranged on the working table 10, or at any appropriate position for an operator. In FIG. 1, the display device 50 is arranged on the working table 10.

The word "connect" or the like may refer to that the two members are directly or indirectly connected to each other. For example, the processor 40 may be directly connected to the detection device 30. Of course, any other members may also be connected between the processor 40 and the detection device 30, as long as a signal may be sent from the detection device 30 to the processor 40.

According to the backlight source flatness detection system in the embodiments of the present disclosure, the distances between the detection device 30 and the at least two detection positions, i.e., at least one position of the center area and at least one position of the peripheral area, of the to-be-detected backlight source on the working table 10 may be detected by the detection device 30, then the distances may be processed by the processor 40 to acquire the warpage value of the to-be-detected backlight source, and then the warpage value may be displayed by the display device 50. The system merely includes the working table 10, the support columns 20, the detection device 30, the processor 40, the display device 50 and some auxiliary members, so it is relatively cheap and has a simple structure. In addition, the flatness of the to-be-detected backlight source may be detected by the detection device 30 after it is placed on the working table 10, so as to achieve the detection in a convenient and efficient manner, thereby to detect the flatness of the backlight sources on a large scale. Further, at least one position of the center area and at least one position of the peripheral area of the to-be-detected backlight source are detected by the detection device 30, so it is able to improve the detection accuracy.

In some embodiments of the present disclosure, the detection device may include an infrared distance measurement sensor, because the infrared distance measurement sensor is cheap and may be used to conveniently measure the distance at high accuracy. In addition, at least one position of the center area and at least one position of the peripheral area of the to-be-detected backlight source need to be detected, so the detection device may include at least two infrared distance measurement sensors.

Figure 2:
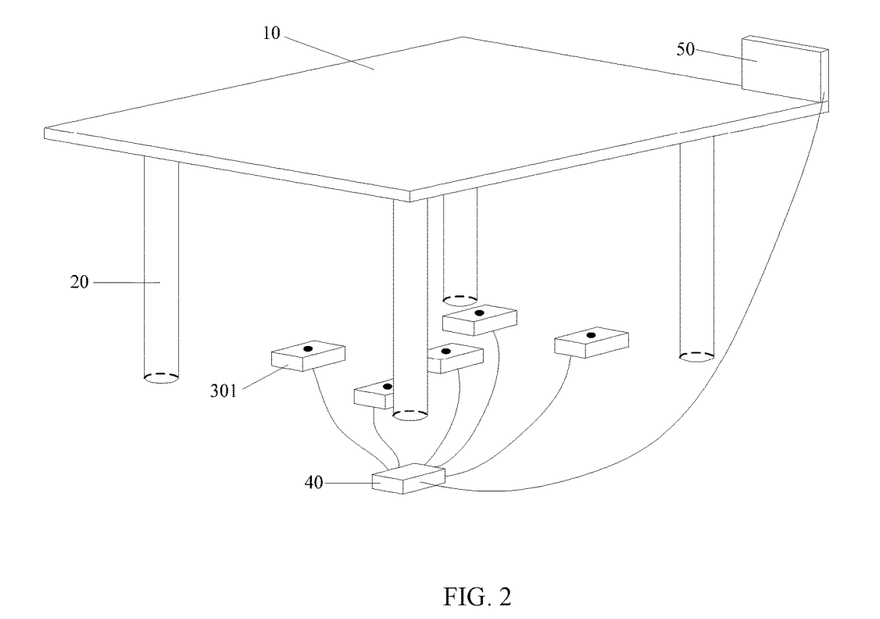
FIG. 2 is another schematic view showing the backlight source flatness detection system according to one embodiment of the present disclosure.

Alternatively, as shown in FIG. 2, the detection device 30 includes at least five infrared distance measurement sensors 301. At least one of the infrared distance measurement sensors 301 is located at a position corresponding to the position of the center area of the to-be-detected backlight source. At least four of the infrared distance measurement sensors 301 are located at positions corresponding to the positions of the peripheral area of the to-be-detected backlight source.

In the embodiments of the present disclosure, it is able to detect at least one position of the center area and at least four positions of the peripheral area of the to-be-detected backlight source through the five infrared distance measurement sensors 301, thereby to improve the detection accuracy in a better manner.

Figure 3:
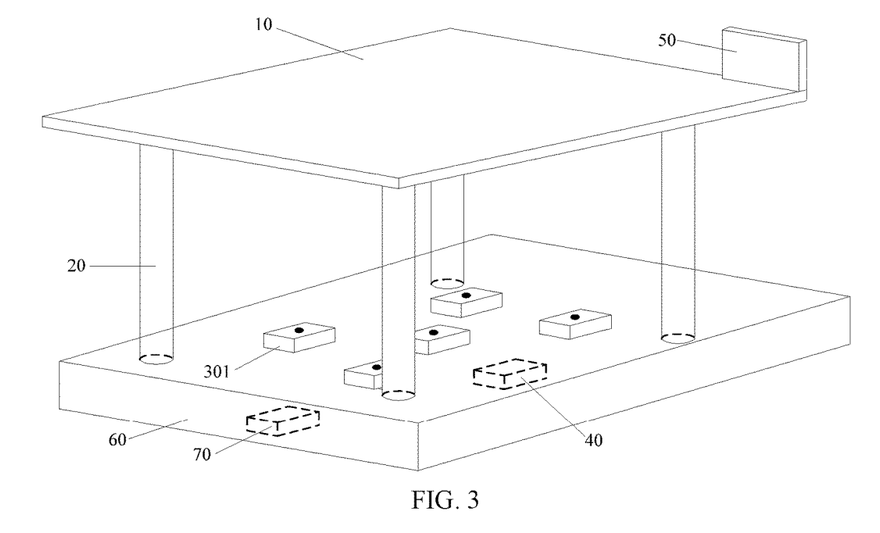
FIG. 3 is yet another schematic view showing the backlight source flatness detection system according to one embodiment of the present disclosure.

Optionally, as shown in FIG. 3, the system further includes a support plate 60 and a controller 70. The support columns 20 and the infrared distance measurement sensors 301 are arranged at an upper surface of the support plate 60. The controller 70 is connected to all the infrared distance measurement sensors 301. The controller 70 is to control the number of the infrared distance measurement sensors 301 used for detecting the to-be-detected backlight source.

The detection system in the embodiments of the present disclosure may be used to detect the flatness of the backlight sources in various sizes. During the detection, different number of the infrared distance measurement sensors 301 may be used for the backlight sources in various sizes. For example, in the case of detecting a large-size backlight source, more infrared distance measurement sensors may be used; and in the case of detecting a small-size backlight source, fewer infrared distance measurement sensors may be used. In order to ensure the detection accuracy, the infrared distance measurement sensors 301 that do not need to be used for the detection may not operate under the control of the controller 70.

It should be appreciated that, the processor 40 and the controller 70 may be arranged inside the support plate 60 as shown in FIG. 3, or independent of the support plate 60, as long as the infrared distance measurement sensors 301 may be connected to the processor 40 and the controller 70 (connection lines are not shown in FIG. 3), the results from the infrared distance measurement sensors 301 may be processed by the processor 40 and the operation of the infrared distance measurement sensors 301 may be controlled by the controller 70.

In some embodiments of the present disclosure, the controller 70 is connected to the infrared distance measurement sensors 301 so as to control the number of the infrared distance measurement sensors 301 for the detection in accordance with the size of the to-be-detected backlight source, thereby to detect the backlight source in various sizes through the detection system. In addition, the infrared distance measurement sensors 301 not used for the detection may not operate under the control of the controller 70, so it is able to prevent a detection result from being adversely affected by the infrared distance measurement sensors 301 not used for the detection, thereby to ensure the detection accuracy and reduce the power consumption.

Optionally, the processor 40 includes a maximum distance calculation module, a minimum distance calculation module, and a subtractor. The subtractor is to subtract a minimum distance acquired by the minimum distance calculation module from a maximum distance acquired by the maximum distance calculation module.

Here, the maximum distance and the minimum distance may be calculated by the maximum distance calculation module and the minimum distance calculation module using a known method, e.g., bubble sorting, choice or interpolation.

Figure 4:
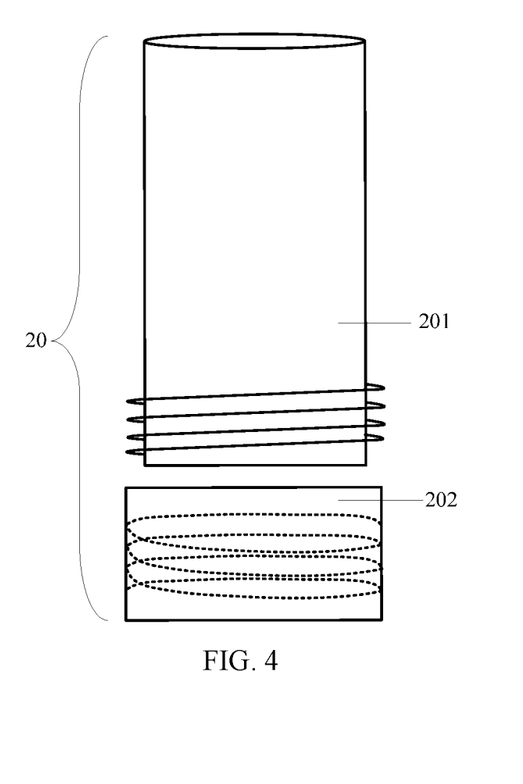
FIG. 4 is a schematic view showing a support column according to one embodiment of the present disclosure.

Optionally, as shown in FIG. 4, the support column 20 includes a support member 201 and an adjustment member 202. The support member 201 is provided with an external screw thread. The adjustment member 202 is provided with an internal thread which engages with the external screw thread to adjust a height of the support member 201.

In some embodiments of the present disclosure, in order to prevent the detection result from being adversely affected by the uneven working table 10, the adjustment member 202 may be rotated, so as to move the support member 201 upward or downward, thereby to adjust the height of the support column 20 and enable flatness of an upper surface of the working table 10 within an acceptable range. For example, when the working table 10 is placed horizontally, the adjustment member 202 may be rotated so as to move the support member 201 upward or downward, thereby to adjust the height of the support column 20 and enable an upper surface of the working table 10 to be in a plane.

During the detection, in the case that a small-size backlight source is placed on the working table, the detection device 30 may not be arranged immediately below the backlight source, and at this time, it is impossible for the detection device 30 to provide the accurate detection result. Hence, the working table 10 may be provided with a region where the to-be-detected backlight source is to be placed, and the detection device 30 may be arranged immediately below the region. In the case that the to-be-detected backlight source is placed on the working table 10 at this region, it may be detected by the detection device 30 conveniently. In this way, it is able to improve the detection accuracy.

Figure 5:
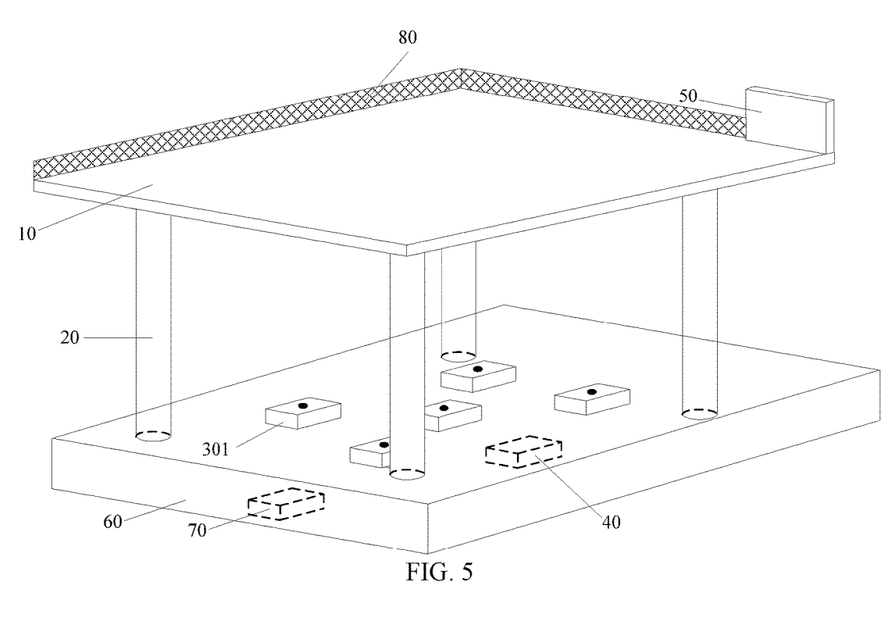
FIG. 5 is still yet another schematic view showing the backlight source flatness detection system according to one embodiment of the present disclosure.

Optionally, as shown in FIG. 5, the system may further include at least two retaining walls 80 arranged on the working table 10 on at least two adjacent edges of the working table.

Two or more retaining walls 80 may be provided. In addition, each retaining wall 80 may be of a height and a length sufficient to fix the to-be-detected backlight source. In the case that the to-be-detected backlight source is placed on the working table 10, its two side surfaces may press against the two adjacent retaining walls 80.

In some embodiments of the present disclosure, through the retaining walls 80 on the working table 10, it is able for the detection device 30 to detect the to-be-detected backlight source conveniently, thereby to improve the detection accuracy.

Figure 7:
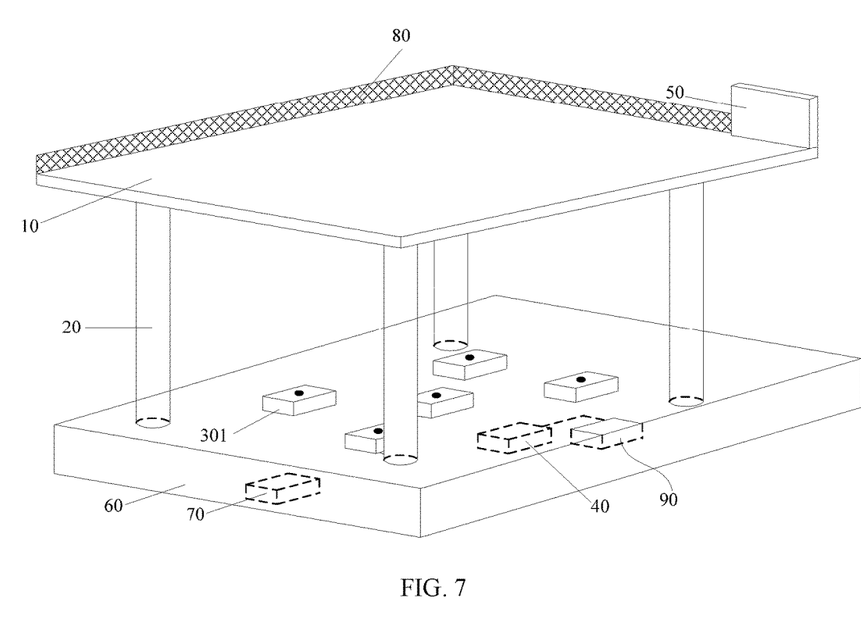
FIG. 7 is still yet another schematic view showing the backlight source flatness detection system according to one embodiment of the present disclosure.

Optionally, the system further includes an alarm device connected to the processor 40. As shown in FIG. 7, the processor 40 is further to compare the warpage value with a predetermined value, and in the case that the warpage value is greater than the predetermined value, to send an alarm signal to the alarm device 90. The alarm device 90 is to send an alarm in accordance with the received alarm signal.

The predetermined value may be set in accordance with the practical need, e.g., 0.2 mm, 0.25 mm or 0.3 mm.

The alarm device may be of any kind, as long as it may send the alarm. For example, it may be a light-emitting diode or a beeper.

For example, in the case that the predetermined value is 0.20 mm and the warpage value acquired by the processor 40 is 0.24 mm, the processor 40 may compare the warpage value with the predetermined value and determine that the warpage value is greater than the predetermined value. At this time, the processor 40 may send an alarm signal to the alarm device, and then the alarm device may make a sound in accordance with the received alarm signal.

In some embodiments of the present disclosure, it is able to intuitively prompt the operator whether or not the backlight source meets the flatness requirement through the alarm device. In addition, different predetermined values may be set, so as to sort the backlight sources with different warpage values.

Figure 6:
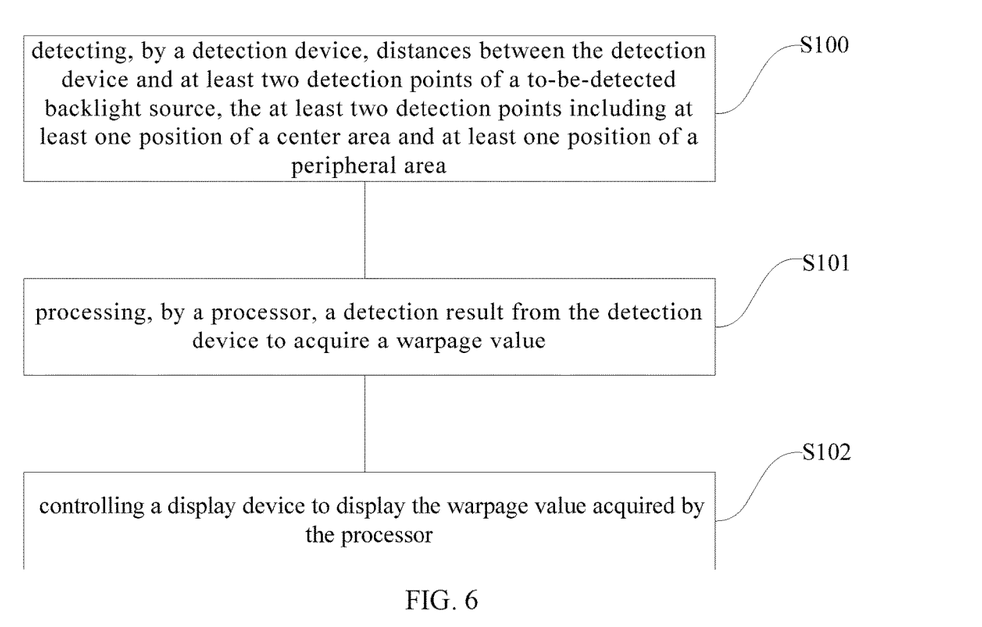
FIG. 6 is a flow chart of a backlight source flatness detection method according to one embodiment of the present disclosure.

The present disclosure further provides in some embodiments a backlight source flatness detection method which adopts the above-mentioned backlight source flatness detection system. As shown in FIG. 6, the method includes the following steps S100-S102.

Step S100 is to detect, by the detection device 30, distances between the detection device 30 and at least two detection positions of the to-be-detected backlight source. The at least two detection positions include at least one position of a center area of the to-be-detected backlight source and at least one position of a peripheral area of the to-be-detected backlight source.

To be specific, one or more positions of the center area and one or more positions of the peripheral area of the to-be-detected backlight source may be detected. Optionally, at least one position of the center area and at least four positions of the peripheral area may be detected.

Step S101 is to process, by the processor 40, a detection result from the detection device 30 to acquire a warpage value.

To be specific, Step S101 includes subtracting, by the processor 40, a minimum distance detected by the detection device 30 from a maximum distance detected by the detection device 30 to acquire the warpage value.

The distances between the detection device 30 and different positions of the backlight source (including at least one position of the center area and at least one position of the peripheral area) may be detected by the detection device 30, and the detected minimum distance may be subtracted by the processor 40 from the detected maximum distance, so as to acquire the warpage value.

In the case that there are several positions of the center area, an average value of the distances between the detection device and these positions of the center area may be calculated, and then the average value may be subtracted from the maximum distance between the detection device and the positions of the peripheral area (at this time the backlight source is warped downwardly) or the minimum distance between the detection device and the positions of the peripheral area may be subtracted from the average value (at this time the backlight source is warped upwardly), so as to acquire the warpage value. In addition, the maximum distance between the detection device and the positions of the peripheral area may be subtracted from the minim distance between the detection device and the positions of the center area (at this time the backlight source is warped downwardly) or the minimum distance between the detection device and the positions of the peripheral area may be subtracted from the maximum value between the detection device and the positions of the center area (at this time the backlight source is warped upwardly), so as to acquire the warpage value.

It should be appreciated that, the maximum distance and minimum distance may be detected and then subtracted from each other. Of course, in some embodiments of the present disclosure, the distances may be subtracted from each other, and then the resultant maximum or minimum value may be used as the warpage value.

Alternatively, Step S101 includes: acquiring, by the processor 40 through fitting, a plane in accordance with the detected distances between the to-be-detected backlight source and the detection device 30, and calculating, by the processor 40, distances between the detection device 30 and the plane and taking a maximum distance as the warpage value.

The detection device 30 is of constant coordinates in a horizontal plane, and coordinates of the detection position of the to-be-detected backlight source detected by the detection device 30 in the horizontal plane are identical to those of the detection device 30. After the distance between each detection position and the detection device 30 is calculated by the processor 40, it is able to acquire three-dimensional coordinates of each detection position. Through fitting, a plane may be acquired by the processor 40 in accordance with the three-dimensional coordinates of the detection positions. Then, the distances between the detection device 30 and the resultant plane may be calculated by the processor 40, and the maximum distance may be taken as the warpage value. In this way, it is able to acquire the warpage value in a more accurate manner.

Alternatively, Step S101 includes: detecting, by the detection device 30, a standard backlight source that meets a flatness requirement and detecting distances between the detection device 30 and the standard backlight source as reference distances; subtracting, by the processor 40, the reference distances from the detected distances between the detection device 30 and the to-be-detected backlight source at corresponding positions, so as to acquire a maximum distance and a minimum distance; and subtracting, by the processor 40, the minimum distance from the maximum distance, so as to acquire the warpage value.

In some embodiments of the present disclosure, the standard backlight source that meets the flatness requirement may be detected by the detection device 30, and the distances between the standard backlight source and the detection device 30 may be used as the reference distances. Then, the distances between the detection device 30 and the to-be-detected backlight source at the corresponding positions may be compared with the reference distances. In this way, it is able to prevent the detection result from being adversely affected by the uneven working table, thereby to improve the detection accuracy.

It should be appreciated that, the so-called "corresponding positions" refer to that the detection positions of the standard backlight source are identical to the detection positions of the to-be-detected backlight source. For example, in the case that the distance between an upper left corner of the standard backlight source and the detection device 30 has been detected, the corresponding position refers to an upper left corner of the to-be-detected backlight source.

Step S102 is to control the display device 50 to display the warpage value acquired by the processor 40.

According to the backlight source flatness detection method in the embodiments of the present disclosure, the distances between the detection device 30 and the at least two detection positions, i.e., at least one position of the center area and at least one position of the peripheral area, of the to-be-detected backlight source on the working table 10 may be detected by the detection device 30, then the distances may be processed by the processor 40 to acquire the warpage value of the to-be-detected backlight source, and then the warpage value may be displayed by the display device 50. The system merely includes the working table 10, the support columns 20, the detection device 30, the processor 40, the display device 50 and some auxiliary members, so it is relatively cheap and has a simple structure. In addition, the flatness of the to-be-detected backlight source may be detected by the detection device 30 after it is placed on the working table 10, so as to achieve the detection in a convenient and efficient manner, thereby to detect the flatness of the backlight sources on a large scale. Further, at least one position of the center area and at least one position of the peripheral area of the to-be-detected backlight source are detected by the detection device 30, so it is able to improve the detection accuracy.

In the case that the detection device 30 includes at least two infrared distance measurement sensors 301, the detection method further includes: controlling the display device 50 to display distances between the at least two detection positions of the to-be-detected backlight source and the at least two infrared distance measurement sensors 301 as well as identifiers of the corresponding infrared distance measurement sensors 301.

In other words, apart from the warpage value of the to-be-detected backlight source acquired by the processor 40, the display device 50 may further display the identifier of each infrared distance measurement sensor 301, and the distance between the infrared distance measurement sensor 301 and the corresponding detection position of the backlight source detected by the infrared distance measurement sensor 301.

The identifier of each infrared distance measurement sensor 301 and the distance between the infrared distance measurement sensor 301 and the corresponding detection position of the backlight source detected by the infrared distance measurement sensor 301 may be displayed at any position of the display device 50, e.g., on the right or at the bottom of the display device 50.

For example, the identifiers of the five infrared distance measurement sensors 301 may be □, □, □, □ and □. Apart from the warpage value of the to-be-detected backlight source, the display device 50 may further display the identifier of each infrared distance measurement sensor 301, and the distance between the infrared distance measurement sensor 301 and the corresponding detection position of the backlight source detected by the infrared distance measurement sensor 301, e.g., □:10.00, □:10.21, □:10.25, □:10.22, or □:10.02.

In some embodiments of the present disclosure, each infrared distance measurement sensor 301 is configured to detect a constant position of the to-be-detected backlight source. In this way, it is able to conveniently determine a warpage degree at the corresponding position of the backlight source in accordance with the identifier of the infrared distance measurement sensor 301 and the distance between the infrared distance measurement sensor 301 and the corresponding detection position, thereby to facilitate the subsequent repairing of the backlight source.

Step S101 specifically further includes: comparing the warpage value with the predetermined value, and in the case that the warpage value is greater than a predetermined value, sending an alarm signal to the alarm device, so as to enable the alarm device to send an alarm.

During the detection, it is able to intuitively prompt the operator whether or not the backlight source meets the flatness requirement through the alarm. Various predetermined values may be set according to the practical need, so as to sort the backlight sources with different warpage values.

Based on the above, prior to detecting the to-be-detected backlight source, the method further includes: detecting flatness of the working table 10.

The step of detecting the flatness of the working table 10 includes: detecting a warpage value of a standard backlight source which meets a flatness requirement and which is placed on the working table 10; in the case that the warpage value of the standard backlight source displayed by the display device 50 is acceptable, detecting, by the detection device 30, the flatness of the to-be-detected backlight source; and in the case that the warpage value of the standard backlight source displayed by the display device 50 is unacceptable, adjusting a height of the support column 20.

In order to prevent the inaccurate detection result caused by the uneven working table 10, the flatness of the working table 10 needs to be detected prior to detecting the to-be-detected backlight source. To be specific, the warpage value of the standard backlight source that meets the flatness requirement may be detected at first. In the case that the warpage value displayed by the display device 50 is acceptable, it means that the working table 10 is flat, and it may be used to detect the flatness of the to-be-detected backlight source. In the case that the warpage value of the standard backlight source is unacceptable, it means that the working table 10 is not flat. At this time, the adjustment member 202 of the support column 20 may be rotated until the working table 10 is flat, and then the working table 10 may be used for detecting the flatness of the to-be-detected backlight source. In this way, through the adjustment of the height of the support column 20, it is able to adjust the flatness of the working table 10 in accordance with the warpage value of the standard backlight source displayed by the display device 50.

In the embodiments of the present disclosure, the flatness of the working table 10 may be detected prior to the detection of the flatness of the to-be-detected backlight source. As a result, it is able to prevent the detection result from being adversely affected by the working table 10, thereby to improve the detection accuracy.

In addition, a height of a probe of each infrared distance measurement sensor 301 may also be adjusted, so that the probes of the infrared distance measurement sensors 301 for detection are spaced at an identical interval from the upper surface of the working table 10. Through the adjustment of the height of the support column 20 or the infrared distance measurement sensor 301, it is able to control the flatness of the working table 10 within a range of 0.05 mm.

It should be appreciated that, all or parts of the steps in the above-mentioned embodiments involving the method may be implemented by hardware related to programs. These programs may be stored in a computer-readable storage medium and executed so as to carry out the steps. The storage medium may be any medium capable of storing therein program codes, e.g., Read Only Memory (ROM), Read Access Memory (RAM), a magnetic disc or an optical disc.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A backlight source flatness detection system, comprising:
   a working table which is transparent and whereon a to-be-detected backlight source is placed;
   a support column whereon the working table is;
   a detection device below the working table and configured to detect distances between the detection device and at least two detection positions of the to-be-detected backlight source, the at least two detection positions comprising at least one position of a center area of the to-be-detected backlight source and at least one position of a peripheral area of the to-be-detected backlight source;
   a processor connected to the detection device and configured to process a detection result from the detection device so as to acquire a warpage value; and
   a display device connected to the processor and configured to display the warpage value.

2. The backlight source flatness detection system according to claim 1, wherein the detection device comprises at least two infrared distance measurement sensors.

3. The backlight source flatness detection system according to claim 2, further comprising a support plate and a controller;
   wherein the support column and the infrared distance measurement sensors are at an upper surface of the support plate; the controller is connected to all the infrared distance measurement sensors and configured to control the number of the infrared distance measurement sensors for detecting the to-be-detected backlight source.

4. The backlight source flatness detection system according to claim 1, wherein the detection device comprises at least five infrared distance measurement sensors; at least one of the infrared distance measurement sensors is at a position which corresponds to the position of the center area of the to-be-detected backlight source; and at least four of the infrared distance measurement sensors are at positions which correspond to the positions of the peripheral area the to-be-detected backlight source, respectively.

5. The backlight source flatness detection system according to claim 4, further comprising a support plate and a controller;
wherein the support column and the infrared distance measurement sensors are at an upper surface of the support plate; the controller is connected to all the infrared distance measurement sensors and configured to control the number of the infrared distance measurement sensors for detecting the to-be-detected backlight source.

6. The backlight source flatness detection system according to claim 1, wherein the processor comprises a maximum distance calculation module, a minimum distance calculation module, and a subtractor configured to subtract a minimum distance acquired by the minimum distance calculation module from a maximum distance acquired by the maximum distance calculation module.

7. The backlight source flatness detection system according to claim 1, wherein the support column comprises a support member with screw threads, and an adjustment member with screw threads; the screw threads of the support member engage with the screw threads of the adjustment member to adjust a height of the support member.

8. The backlight source flatness detection system according to claim 1, further comprising at least two retaining walls on the working table;
wherein the at least two retaining walls are on at least two adjacent edges of the working table.

9. The backlight source flatness detection system according to claim 1, further comprising an alarm device connected to the processor;
wherein the processor is further configured to compare the warpage value with a predetermined value, and send an alarm signal to the alarm device when the warpage value is greater than the predetermined value;
wherein the alarm device sends an alarm in response to the alarm signal from the processor.

10. The backlight source flatness detection system according to claim 1, further comprising at least two retaining walls on the working table and perpendicular to each other.

11. A backlight source flatness detection method which adopts the backlight source flatness detection system according to claim 1, comprising steps of:
detecting, by a detection device, distances between the detection device and at least two detection positions of a to-be-detected backlight source, the at least two detection positions comprising at least one position of a center area of the to-be-detected backlight source and at least one position of a peripheral area of the to-be-detected backlight source;
acquiring a warpage value, by a processor via processing a detection result from the detection device; and
controlling a display device to display the warpage value acquired by the processor.

12. The backlight source flatness detection method according to claim 11, wherein the step of acquiring the warpage value, by the processor via processing the detection result from the detection device, comprises:
subtracting, by the processor, a minimum distance detected by the detection device from a maximum distance detected by the detection device to acquire the warpage value.

13. The backlight source flatness detection method according to claim 12, wherein prior to detecting the to-be-detected backlight source, the backlight source flatness detection method further comprises: detecting flatness of a working table;
wherein the step of detecting the flatness of the working table comprises:
detecting a warpage value of a standard backlight source which meets a flatness requirement and which is placed on the working table;
controlling the detection device to detect the flatness of the to-be-detected backlight source, when the warpage value of the standard backlight source displayed by the display device is acceptable; and
adjusting a height of a support column in support of the working table, when the warpage value of the standard backlight source displayed by the display device is unacceptable.

14. The backlight source flatness detection method according to claim 11, wherein the step of acquiring the warpage value, by the processor via processing the detection result from the detection device, comprises:
acquiring, by the processor and through fitting, a plane in accordance with the detected distances between the to-be-detected backlight source and the detection device; and
calculating, by the processor, distances between the detection device and the plane and taking a maximum distance as the warpage value.

15. The backlight source flatness detection method according to claim 14, wherein prior to detecting the to-be-detected backlight source, the backlight source flatness detection method further comprises: detecting flatness of a working table;
wherein the step of detecting the flatness of the working table comprises:
detecting a warpage value of a standard backlight source which meets a flatness requirement and which is placed on the working table;
controlling the detection device to detect the flatness of the to-be-detected backlight source, when the warpage value of the standard backlight source displayed by the display device is acceptable; and
adjusting a height of a support column in support of the working table, when the warpage value of the standard backlight source displayed by the display device is unacceptable.

16. The backlight source flatness detection method according to claim 11, wherein the step of acquiring the warpage value, by the processor via processing the detection result from the detection device, comprises:
detecting, by the detection device, a standard backlight source that meets a flatness requirement and taking detected distances between the detection device and the standard backlight source as reference distances;
acquiring a maximum distance and a minimum distance, by the processor, via subtracting the reference distances from detected distances between the detection device and the to-be-detected backlight source at corresponding positions; and
acquiring the warpage value, by the processor, via subtracting the minimum distance from the maximum distance.

17. The backlight source flatness detection method according to claim 16, wherein prior to detecting the to-be-detected backlight source, the backlight source flatness detection method further comprises: detecting flatness of a working table;
   wherein the step of detecting the flatness of the working table comprises:
   detecting a warpage value of a standard backlight source which meets a flatness requirement and which is placed on the working table;
   controlling the detection device to detect the flatness of the to-be-detected backlight source, when the warpage value of the standard backlight source displayed by the display device is acceptable; and
   adjusting a height of a support column in support of the working table, when the warpage value of the standard backlight source displayed by the display device is unacceptable.

18. The backlight source flatness detection method according to claim 11, wherein the detection device comprises at least two infrared distance measurement sensors, and the backlight source flatness detection method further comprises:
   controlling the display device to display distances between the at least two detection positions of the to-be-detected backlight source and the infrared distance measurement sensors, and identifiers of the corresponding infrared distance measurement sensors.

19. The backlight source flatness detection method according to claim 11, wherein the step of acquiring the warpage value, by the processor via processing the detection result from the detection device, further comprises:
   comparing the warpage value with a predetermined value, and sending an alarm signal to an alarm device when the warpage value is greater than a predetermined value, so as to enable the alarm device to send an alarm.

20. The backlight source flatness detection method according to claim 11, wherein prior to detecting the to-be-detected backlight source, the backlight source flatness detection method further comprises: detecting flatness of a working table;
   wherein the step of detecting the flatness of the working table comprises:
   detecting a warpage value of a standard backlight source which meets a flatness requirement and which is placed on the working table;
   controlling the detection device to detect the flatness of the to-be-detected backlight source, when the warpage value of the standard backlight source displayed by the display device is acceptable; and
   adjusting a height of a support column in support of the working table, when the warpage value of the standard backlight source displayed by the display device is unacceptable.

* * * * *